G. F. ROSER.
WASTE PIPE CONNECTION.
APPLICATION FILED AUG. 11, 1914.
1,172,836.  Patented Feb. 22, 1916.
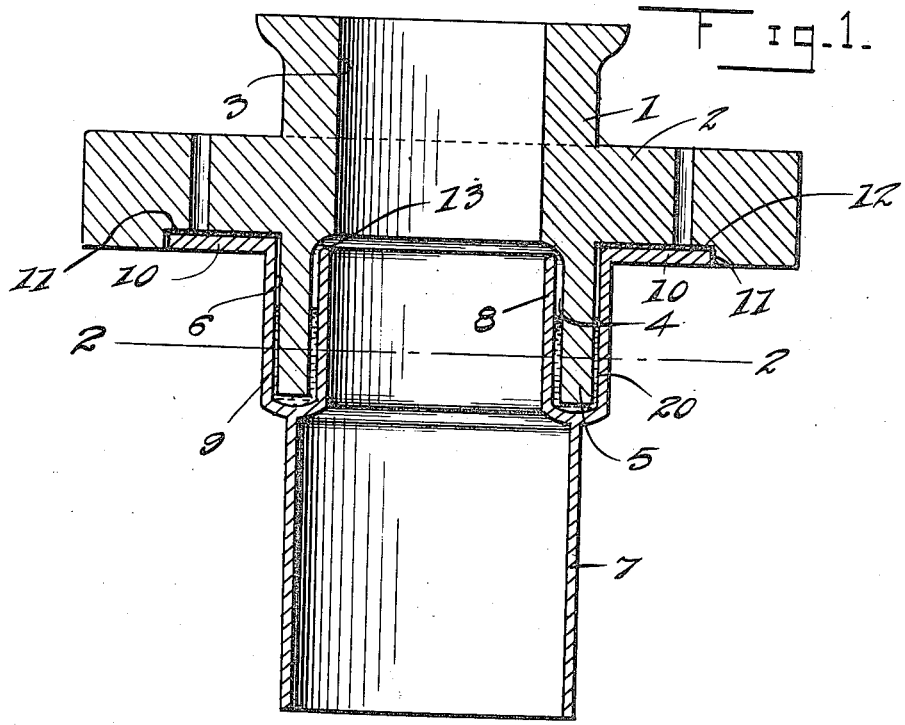
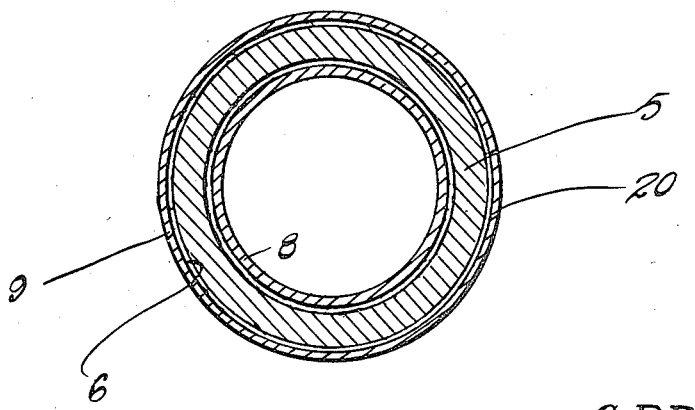

UNITED STATES PATENT OFFICE.

GEORGE F. ROSER, OF LOUISVILLE, KENTUCKY.

WASTE-PIPE CONNECTION.

1,172,836.  Specification of Letters Patent.  Patented Feb. 22, 1916.

Application filed August 11, 1914. Serial No. 856,253.

*To all whom it may concern:*

Be it known that I, GEORGE F. ROSER, a citizen of the United States, residing at Louisville, in the county of Jefferson and State of Kentucky, have invented certain new and useful Improvements in Waste-Pipe Connections; and I do hereby declare the following to be a full, clear, and exact description of the invention, such as will enable others skilled in the art to which it appertains to make and use the same.

This invention relates to plumbing and more particularly to a connection between an outlet of a plumbing fixture and the waste pipe for carrying away the waste matter from the fixture.

The primary object of this invention is the provision of a ferrule which is provided with a chamber to receive the waste outlet of such plumbing fixtures as rest upon the floor, such as water closets, slop sinks, or the like, and to provide a liquid sealing element to form an air-tight connection between the ferrule and the waste outlet of the plumbing fixture to prevent the passage of sewer gases from the joint, between the plumbing fixture and the waste pipe.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which :—

Figure 1 is a central sectional view through the improved waste pipe connection, and Fig. 2 is a cross sectional view on the line 2—2 of Fig. 1.

Referring more particularly to the drawings, 1 designates the waste pipe outlet of a suitable type of plumbing fixture such as a water closet bowl, a slop sink or the like which is mounted upon the floor. The outlet fixture has an annular flange 2 formed thereupon which is provided for resting upon the floor (not shown) of the room in which the plumbing fixture is mounted. The fixture 1 has a bore 3 extending therethrough, which bore is enlarged in the lower portion of the fixture as at 4. The enlarged portion 4 of the bore 3 is formed in a depending flange 5 which is formed upon the under surface of the fixture 1 and depends from the flange 2, being provided for seating in the chamber 6 which is formed in the ferrule connection 7. The ferrule connection 7 is substantially circular in cross section. The upper end of the ferrule 7 is constructed of inner and outer walls 8 and 9 respectively, which are spaced to form the chamber 6, and the walls are connected at their lower ends, and to the wall of the ferrule 7 as is clearly shown in Fig. 1 of the drawings. The outer wall 9 has a transversely extending flange 10 formed thereupon, which flange is seated in an annular recess 11 which is formed in the under surface of the flange 2. If it is so desired a rubber or other pliable gasket 12 may be mounted within the annular recess 11 for abutment against the flange 10 to form a fluid-tight connection between the flange 10 and the flange 2.

The depending flange 5, which is formed upon the fixture 1 is seated within the chamber 6 of the ferrule 7. The upper end of the inner wall 8 is spaced from the inner wall of the bore 4 leaving an opening or space 13 between the inner wall 8 and the wall of the bore 4 so as to permit water to flow into the chamber 6 to assist in forming an air-tight joint between the flange 5 and the ferrule 7.

In the constructing of the outlet as heretofore described, mercury, indicated by the numeral 20 of the drawings is poured within the chamber 6 and being an active liquid sealing element it will form an air-tight connection between the outlet 6 and the ferrule 7. The ferrule 7 may be connected in any suitable manner to the waste pipe of a drainage system. By the provision of the transversely extending flange 10 the ferrule 7 is positively supported by the floor of the room in which the fixture is mounted.

In reducing the invention to practice certain minor features of construction, combination and arrangement of parts may necessitate alterations to which the patentee is entitled provided such alterations are comprehended within the scope of what is claimed.

What is claimed is:

In a waste pipe connection, the combination with an outlet fixture having a transversely extending flange and a second flange depending from the transversely extending flange, of a member comprising spaced walls forming a chamber for receiving the depending flange, a sealing liquid in the said chamber for forming an air tight connection around the depending flange, a transversely extending flange formed upon the upper end of the outer of said spaced walls and adapted to coöperate with the first named transversely extending flange and to bear a packing upon its upper surface, the inner of said spaced walls being spaced from the depending flange to permit of the entrance of water therebetween to assist in forming an air tight connection around said depending flange.

In testimony whereof I affix my signature in presence of two witnesses.

GEORGE F. ROSER.

Witnesses:
    JACOB ISAACS,
    FRANKIE H. ARNOLD.